UNITED STATES PATENT OFFICE 2,648,699

QUATERNARY AMMONIUM SALTS OF DIISOPROPYLAMINOALKYL ESTERS OF DIPHENYLACETIC ACID

Richard A. Robinson, Morton Grove, Ill., assignor to G. D. Searle & Co., Chicago, Ill., a corporation of Illinois No Drawing. Application February 24, 1950, Serial No. 146,147

3 Claims. (Cl. 260—469)

The present invention relates to new and therapeutically valuable quaternary ammonium compounds and more particularly to diphenylacetates of di-isopropyl-hydroxyalkylmethyl ammonium salts.

The compounds which comprise this invention have the following general structural formula

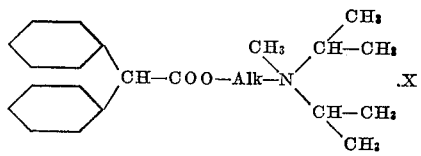

wherein Alk is a lower alkylene group and X is the equivalent of an anion.

The alkylene groups which A may represent are bivalent, saturated, aliphatic hydrocarbon radicals of from two to eight carbon atoms. These radicals are derived from straight-chained or branched-chained aliphatic hydrocarbons and include such radicals as ethylene, propylene, butylene, amylene and polymethylene radicals such as trimethylene, tetramethylene and related polymethylenes including octamethylene.

In the foregoing structural formula X is the equivalent of an anion such as chloride, bromide, iodide, sulfate, methyl sulfate, ethyl sulfate, phosphate, citrate, lactate, ascorbate, tartrate, benzenesulfonate and the like.

The compounds which constitute this invention show unusual therapeutic properties, especially in their action inhibiting autonomic nervous function. Unlike the usual sympathicolytics, such as N-(2-chloroethyl) dibenzylamine, 2-benzyl-2-imidazoline and ergotamine, and parasympathicolytics such as atropine and the belladonna alkaloids, which act on the neuromuscular junction, the diphenylacetates which constitute my present invention have a blocking effect on the sympathetic and parasympathetic impulses as they travel through the ganglia. Thus, the impulse actually never reaches the myoneural junction.

The examples below describe in detail certain of the compounds which comprise this invention and methods for producing them. However, this invention is not to be construed as limited thereby in spirit and in scope. To one skilled in the art it will be apparent that numerous modifications in methods and materials may be made without departing from the invention. In each of the following examples, temperatures are given in degrees centigrade, parts by weight in grams (g.) and parts by volume in milliliters (ml.). Pressures during vacuum distillation are measured in millimeters (mm.) of mercury.

Example 1

A mixture of 16.3 g. of diisopropylaminoethyl chloride, 21 g. of diphenyl acetic acid and 100 ml. of isopropanol is heated at reflux temperature for 2 hours and then vacuum distilled at 30 mm. To obtain the free base of the beta-diisopropylaminoethyl ester of diphenyl acetic acid one extracts with water, treats with aqueous potassium carbonate and extracts with ether. The ether solution is dried over sodium sulfate and then over potassium carbonate. The ether is again removed at 30 mm. pressure and the residue, which weighs 32 g., distilled at 0.05 mm. pressure. The ester distils at 153° without evidence of decomposition, 20 g. of pure material being obtained. The hydrochloride, obtained by treatment of the ether solution with alcoholic hydrogen chloride, forms white crystals, which melt at 84°.

Example 2

35 g. of the beta-diisopropylaminoethyl ester of diphenyl acetic acid, obtained by the method described in Example 1, are stored with 23 g. of methyl bromide and 125 ml. of ethyl methyl ketone in a closed system for 15 hours at 70°. 13 g. of white crystals of the diphenyl acetate of N-(2 - hydroxyethyl) - N,N - diisopropyl-N-methyl ammonium bromide separate. The crystals are washed with ethyl methyl ketone and dried at 70°; they melt at 176°. The filtrate is treated with 13 g. of additional methyl bromide and again stored at 70° for 18 hours, giving an additional 13 g. yield. If the filtrate is concentrated to 100 ml. and again treated with 23 g. of methyl bromide, 15 g. of additional crystals may be obtained.

In order to convert this bromide into the citrate, one dissolves 3 mols of the bromide in absolute methanol and treats this solution with 1 mol of silver citrate and 2 mols of citric acid, filters and concentrates the solution by distilling at 30 mm.

Example 3

35 g. of diphenyl acetic acid and 32 g. of delta-diisopropylaminobutyl chloride are heated in 175 ml. of isopropanol at reflux temperature for 3 hours and then distilled at 30 mm. The residue is treated with an aqueous solution of potassium carbonate and then extracted with diethyl ether. The ether solution is dried over potassium carbonate, the potassium carbonate filtered off, and the filtrate distilled at 30 mm. to remove the ether. The residual oil consists mostly of delta-diisopropylaminobutyl diphenyl acetate.

*Example 4*

The ester obtained as in Example 3 is stored with a 20% excess of dimethyl sulfate in a solution of 2-butanone in a closed system for 48 hours at 70°. White crystals of the diphenyl acetic acid ester of N - (delta - hydroxybutyl) - N,N - di-isopropyl-N-methyl-ammonium sulfate separate. By evaporation of the filtrate and addition of a further amount of methylating agent, one may obtain an additional yield.

I claim:

1. The compounds of the structural formula

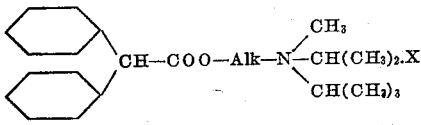

wherein Alk is an alkylene radical and wherein X is one equivalent of an anion.

2. The quaternary ammonium salts of β-diisopropylaminoethyl diphenylacetate of the general formula

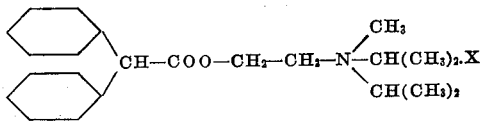

wherein X is one equivalent of an anion.

3. The halides of the diphenyl acetate of N-(beta-hydroxyethyl)-N,N-diisopropyl-N - methyl ammonium of the general formula shown in claim 2 where X is a halide ion.

RICHARD A. ROBINSON.

References Cited in the file of this patent

Jensen et al., Acta Chem. Scand, 2 381–383 (1948).